(12) United States Patent
Tabatowski-Bush (10) Patent No.: US 8,089,248 B2
(45) Date of Patent: Jan. 3, 2012

(54) BATTERY MONITORING AND CONTROL SYSTEM AND METHOD OF USE INCLUDING REDUNDANT SECONDARY COMMUNICATION INTERFACE

(75) Inventor: Ben A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 12/421,572

(22) Filed: Apr. 9, 2009

(65) Prior Publication Data

US 2010/0259221 A1    Oct. 14, 2010

(51) Int. Cl.
H02J 7/00 (2006.01)
(52) U.S. Cl. .................................... 320/116; 320/119
(58) Field of Classification Search .............. 320/116, 320/119, 134, 136
See application file for complete search history.

(56) References Cited

U.S. PATENT DOCUMENTS

| | | | | |
|---|---|---|---|---|
| 4,819,225 A | * | 4/1989 | Hochstein | 370/216 |
| 5,469,042 A | * | 11/1995 | Ruhling | 320/122 |
| 5,619,417 A | * | 4/1997 | Kendall | 702/63 |
| 5,666,040 A | * | 9/1997 | Bourbeau | 320/118 |
| 6,211,644 B1 | | 4/2001 | Wendelrup et al. | |
| 6,274,950 B1 | * | 8/2001 | Gottlieb et al. | 307/66 |
| 6,687,231 B1 | * | 2/2004 | Czerwiec et al. | 370/244 |
| 6,915,220 B2 | | 7/2005 | Cardinal et al. | |
| 7,091,697 B2 | | 8/2006 | Mader et al. | |
| 7,859,223 B2 | * | 12/2010 | Gorbold | 320/119 |
| 7,990,101 B2 | * | 8/2011 | Hoff et al. | 320/107 |
| 2005/0164230 A1 | | 7/2005 | Vale et al. | |
| 2006/0071643 A1 | | 4/2006 | Carrier et al. | |
| 2006/0139007 A1 | | 6/2006 | Kim | |
| 2007/0279953 A1 | * | 12/2007 | Hoff et al. | 363/87 |
| 2008/0180106 A1 | * | 7/2008 | Gorbold | 324/434 |

* cited by examiner

*Primary Examiner* — Edward Tso
*Assistant Examiner* — Manuel Hernandez
(74) *Attorney, Agent, or Firm* — David Kelley, Esq.; Tung & Associates (57) ABSTRACT

A battery monitoring and control system and method of monitoring and controlling provides a redundant and independent symmetric secondary serial bus in addition to a primary serial bus within a battery monitoring and control system that includes a plurality of battery monitoring modules and associated IC battery monitor chips in serial communication with a system controller. Additionally, no two serial communication pins from an interface in operative communication with an associated one of a primary or a secondary serial bus are directly adjacent thereby allowing for continuous battery operation when a single pin in a series of battery monitoring modules becomes non operational failed. Additionally, the battery system remains operational when an open or short circuit occurs in only one of either the primary or secondary serial bus.

20 Claims, 6 Drawing Sheets

FIG. 8 ively to monitoring and
controlling a battery system and providing a link between a
plurality of batteries and more particularly to a method of
monitoring a redundant link between batteries and associated
integrated circuit (IC) battery modules.

BACKGROUND OF THE INVENTION

Battery electronics for batteries associated with electric or hybrid vehicles present several challenges in managing the connections between batteries, as well as monitoring and managing battery output. Existing IC battery monitor chip architecture includes either a serial or a parallel communication link from the battery monitor chip to a system controller, the system controller coordinating all battery monitor chips in a system and gathering data therefrom while also controlling charge balancing of the individual batteries.

As electric or hybrid vehicles typically include a plurality of batteries, these individual batteries are each managed by an associated battery monitor chip. In order for the plurality of batteries to behave as a single, larger battery, each respective battery monitor chip is in signal communication with the system controller.

Many modern battery monitor IC's support a "serial daisy chain" method of connecting battery monitor chips together, thereby avoiding the associated costs and complexities of serial isolators between the system controller and each battery monitor chip. However, by using the "serial daisy chain," a circuit in the battery system is created whereby if any of the electrical connections included in the serial link between each respective battery monitor chip of the plurality of battery monitor chips in a "serial daisy chain" form an open-circuit or a short-circuit to an adjacent node, then serial communication fails for each battery monitor chip on the serial chain.

Without a redundant communication link between each battery monitor chip of the plurality of battery monitor chips, a failure in the serial link between each battery monitor chip may result in the shutdown of the entire battery system.

While existing devices serve their intended purposes, what is needed is a low cost and robust solution to the single-point failure modes in the serial daisy chain links provided by the creation of a symmetrical and redundant serial link.

SUMMARY OF THE INVENTION

A battery monitoring and control system includes at least one battery cell operatively connected with at least one electronic device; at least one battery monitor module, associated with each of the at least one battery cells, and having a primary communication interface and a redundant secondary communication interface; a system controller in operative and in signal communication with each battery monitor module configured to monitor and gather data from the at least one battery chip, and to execute instructions to control charge balancing of the at least one battery cell; primary and secondary communication links configured to independently electrically couple the at least one battery monitoring module to the system controller.

A method of monitoring and controlling the battery monitor and control system includes performing a self-test of the system to determine system functionality; determining functionality of a primary serial communication link; determining functionality of a redundant secondary serial communication link; selecting a communication link from the primary or the secondary serial communication link to communicate between one or more battery monitor modules and a system controller; providing notification to a user if system functionality is reduced; and implementing a limited operation strategy (LOS) if the system functionality is reduced.

DETAILED DESCRIPTION OF THE INVENTION

The battery monitoring and control system and method of use of the invention disclosed herein provides a more robust commutation interface compared to special purpose hardware pins provided to backup a primary communication interface that are known in the art. The system and method provides a redundant and independent symmetric secondary serial bus in addition to a primary serial bus. Additionally, no two serial communication pins from an interface in operative communication with an associated one of a primary or a secondary serial bus are directly adjacent thereby allowing for continuous battery operation when a single pin in a series of battery monitoring modules becomes non operational failed. Additionally, the battery system remains operational when an open or short circuit occurs in only one of either the primary or secondary serial bus.

Figure 1:
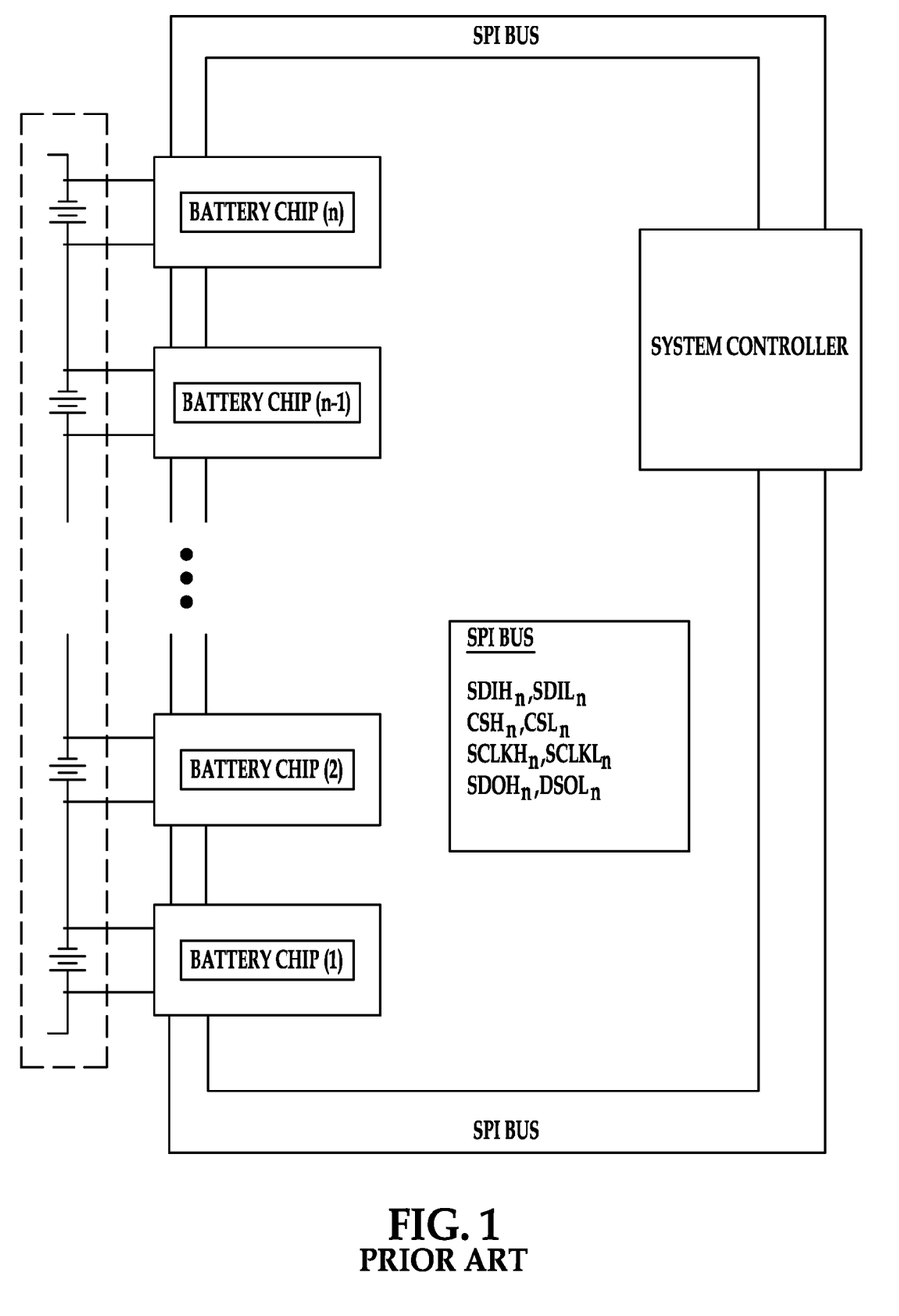
FIG. 1 illustrates a prior art system of linking a plurality of battery monitor chips.

Referring now to the drawings, in particular FIG. 1. FIG. 1 illustrates a prior art system of placing a plurality of battery monitor chips and a system controller in electrical and signal communication. As may be seen in FIG. 1, only a single serial connection maintains communication between each respective battery and the system controller. A non-conforming event in any component of the serial link may cause a vehicle having the system illustrated in FIG. 1 to be rendered nonoperational.

Figure 2:
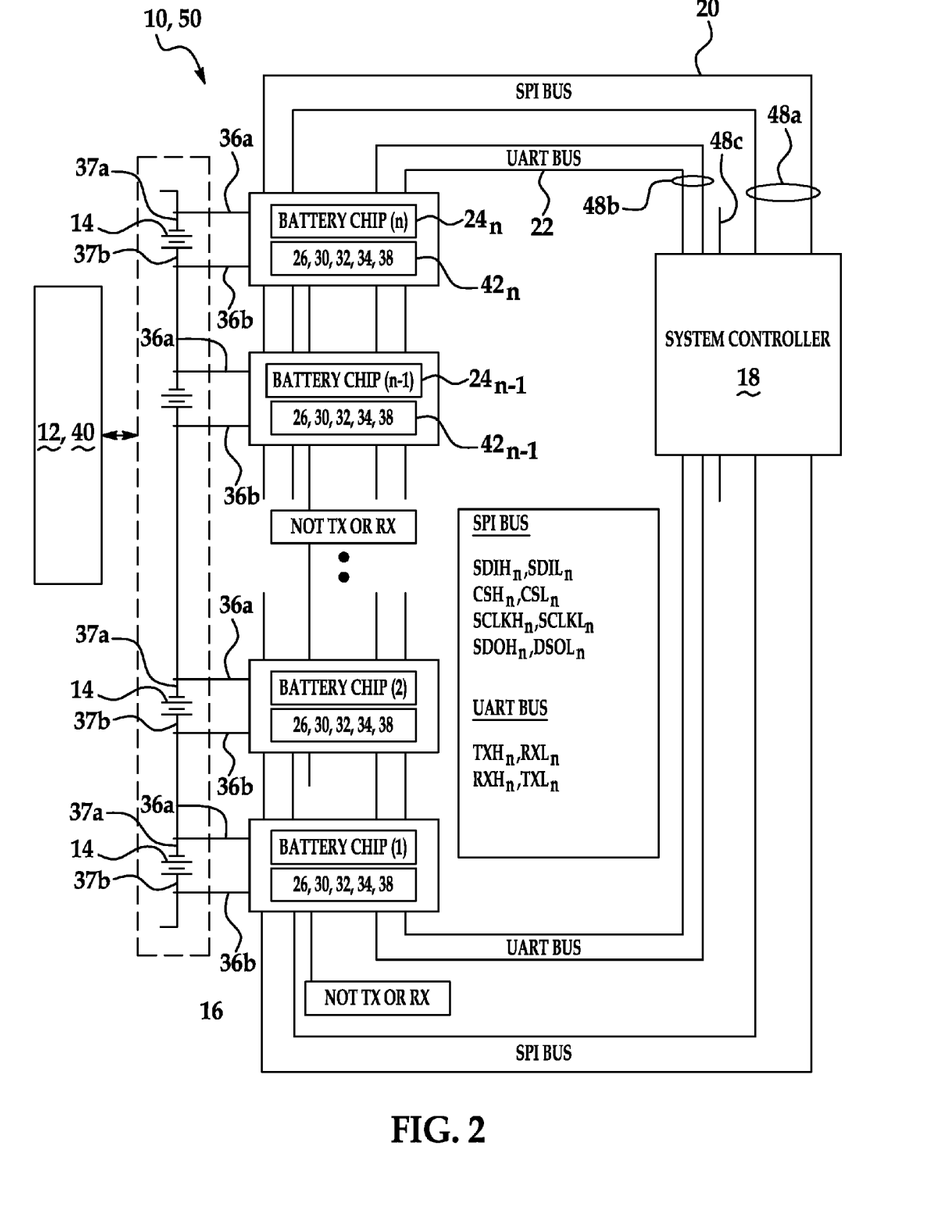
FIG. 2 illustrates a battery monitoring and control system including plurality of battery monitor modules and chips in serial communication with a system controller and with each other in accordance with one embodiment of the invention.

FIG. 2 illustrates a block diagram of a battery monitor system 10 in accordance with one embodiment of the invention. Generally, the system 10 includes at least one electronic device 12; a plurality of battery cells 16 or batteries 16 in operative electrical communication with the at least one electronic device 40 to power the at least one electronic device 40; at least one or a plurality of battery monitor modules 42 each associated with a respective one of the plurality of battery cells 14 or batteries 16; a system controller 18 in operative and signal communication with each battery monitor module 42, a primary battery communication link 20; and a secondary battery communication link 22 that is symmetrically and redundantly configured independent of the primary battery communication link 20, wherein each of the primary and secondary battery communication links 20, 22 are respectively in operative and in serial signal communication with each of the battery monitoring modules 42 and with the system controller 18.

In one embodiment of the invention, each respective battery cell 14 associated with one or more batteries or battery packs 16 may be a lithium-ion battery cell, a fuel cell, or an electrochemical cell. Collectively, the plurality of battery cells 14 in electro-chemical communication with each other may be referred to herein as a battery pack 16.

In one embodiment of the invention, the electronic device 40 may be any electrical component or device powered by a battery cell 14 or battery pack 16. The electronic device 40 may be associated with an electric or hybrid vehicle. The vehicle may include, but is not limited to: an automobile, a light duty truck, a heavy truck, a motorcycle, or any other vehicle whether the vehicle is designed and intended to carry passengers, cargo, or any combination thereof. Additionally, the vehicle may be electric, hybrid, hybrid electric or fuel cell vehicles. The present invention can be used, however, with any hybrid or non-hybrid system without deviating from the scope of the present invention, including vehicles powered by internal combustion engines, series hybrid electric vehicles (SHEV), parallel hybrid electric vehicles (PHEV), fuel cell vehicles and electric vehicles.

In one embodiment of the invention, each of the respective battery monitoring modules 42 may include any combination of hardware or software that cooperate to monitor and communicate battery parameters and conditions to other modules.

In another embodiment of the invention, each of the respective battery monitor modules 42 may include a battery diagnostics module 26, the battery diagnostics module operating to determine battery parameters which may include, but are not limited to: state-of-charge (SOC), open circuit voltage (OCV), and current draw.

Each of the primary and a secondary battery communication links 20, 22 are included between the system controller 18 and the plurality of battery monitoring modules 42, wherein in an embodiment of the invention, each of the battery monitoring modules 42 further includes a sensor 30 for sensing a desired battery cell parameter, a self-contained power supply 32 and voltage regulator 34 therein having the voltage across the battery cell terminals 37a, 37b as an input thereto, and an integrated processor 38 for processing data received from and transmitted to one of the communication links. The self-contained power supply 32 may be configured for providing power to the sensor 30.

In one embodiment of the invention, each respective battery monitoring module 42 may include a serial controller in the form of an IC battery monitor chip 24 that communicates with the system controller 18 via one or more serial interfaces.

As illustrated in FIG. 2, in operation, a plurality of battery monitor chips 24 are connected in series, one to another. Referring to FIG. 2, exemplary battery monitor chips $24_n$ are illustrated, wherein n number of battery monitor chips are serially connected together, wherein n is a positive integer. Each battery monitor chip 24 is also in electrical and signal communication with at least one battery cell 14 or battery pack 16.

Each respective battery monitor chip 24 may be in signal and electrical communication with the associated battery diagnostics module 26 for the associated battery with an adjacent battery monitor chip 24 and with the system controller 18.

In an embodiment of the invention, the at least one battery monitoring module 42 may include plurality of battery monitoring modules, up to an "n" number of modules, wherein n is a positive integer, wherein each battery monitoring module 42 has an associated battery monitor chip 24. Each of the battery monitoring modules 24 has a pair of input leads 36a, 36b coupled across the terminals 37a, 37b of a corresponding battery cell 14 included within a battery pack 16.

In an embodiment of the invention each battery monitor chip 24 includes at least one primary and at least one secondary communication interface 44, 46, wherein the at least one primary communication interface 44 is referred to herein as a Serial Peripheral Interface (SPI) and wherein the at least one secondary communication interface 46 is referred herein as a Universal Asynchronous Receiver/Transmitter (UART) interface.

The SPI and the UART interfaces 44, 46 associated with each respective battery monitor chip 24 are each respectively and independently associated with the SPI communication link 20 and the UART communication link 24.

Each of the SPI and UART interfaces 44, 46 are adapted to provide electrical and signal communication between each of the respective battery monitor chips 24, as well as placing each respective battery monitor chip 24 in electrical and signal communication with the system controller 18.

An output from each battery cell 14 or battery pack 16 is connected to a respective battery monitor chip 24 and further to the system controller 18 by means of a connection enabling digital, serial communication comprising transmission of bytes consisting of a number of bits transmitted via either the primary or the secondary communication link 20, 24.

Each battery monitor chip 24 includes a plurality of pins adapted to provide input or output to the battery monitor chip from one or more serial interfaces, wherein calculations may be performed thereupon by the integrated processor 38 included with each battery monitoring module 42.

Figure 3:
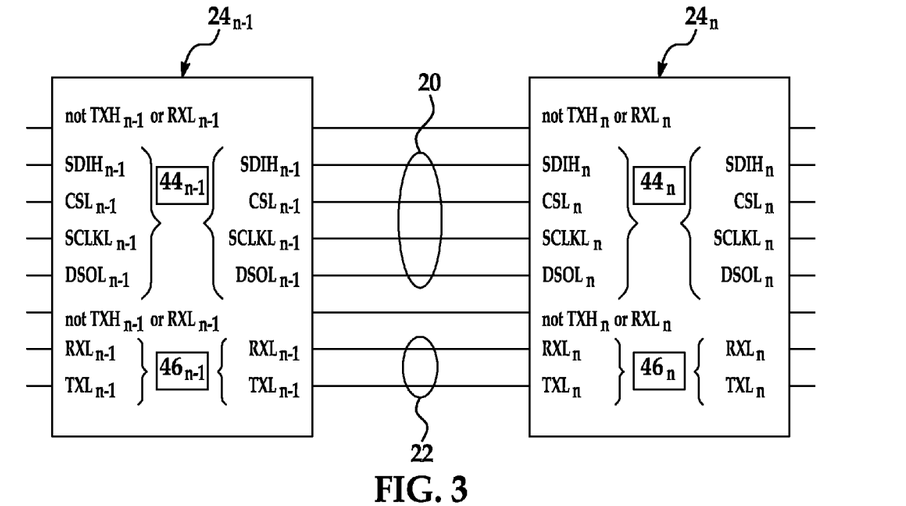
FIG. 3 illustrates a detailed view of two battery monitor chips each having a primary and a secondary communication interface each respectively linked to a primary and a secondary battery communication link in accordance with one embodiment of the invention.

In an embodiment of the invention shown in FIGS. 2-3, each respective battery monitor chip 24 includes a plurality of pins that cooperate to form the SPI 44 and a plurality of pins that cooperate to form the UART interface 46.

Each of the battery monitor chips 24 are daisy chained together (as shown in more detail in FIG. 3). Pins associated with a lower voltage potential battery monitor chip connecting to a next higher potential chip in the chain are identified with an "H" suffix, and pins associated with the next higher potential chip in communication with the previous lower voltage potential battery monitor chip are identified with a "L" suffix, wherein each of the "L" suffix pins connect with the "H" suffix pins from the previous lower potential chip in the chain.

FIG. 3 is a detailed view of the pins and connections between chip $24_{n-1}$ and chip $24_n$. In an embodiment of the invention including a first and second battery monitor chip $24_{n-1}$, $24_n$, as is illustrated in FIG. 3, it may be seen that each of the "$H_{n-1}$" suffix pins of the first battery monitor chip $24_{n-1}$ are placed in communication with the corresponding "$L_n$" suffix pins of the second battery monitor chip $24_n$. The "$H_n$" suffix pins of the second battery monitor chip $24_n$ are in turn placed in signal communication with a next higher potential chip $24_{n-1}$ (not shown) or the system controller 18 (shown in FIG. 2), the system controller 18 including pins 48a, 48b, 48c (shown in FIG. 2) adapted to be placed in signal communication with one or more battery monitor chips 24.

In an embodiment of the invention, the primary communication link 20 is a SPI serial communication link or SPI bus, wherein the terms link and bus are used interchangably herein to define a data communication path between one or more electric or electronic devices.

In an embodiment of the invention, each battery monitor chip 24 may be a modified Low Profile Quad Flat Package (LQFP) integrated circuit chip.

In an embodiment of the invention, several standard SPI pin names may be changed as follows: MOSI (master Out Slave in) is referred to as SDO (serial Data Out); MISO (Master In slave out) is referred to as SDI (Serial Data In). However, some pin names retain the standard SPI bus naming including CS for Chip Select, and SCLK for Serial Clock.

Each of the battery monitor chips $24_{n-1}$, $24_n$ includes an SPI interface including, but not limited to at least four SPI interface link nodes 44 ($44_{n-1}$ associated with chip $24_{n-1}$ and $44_n$ associated with chip $24_n$): two SPI serial clock pins $SCLKH_n$, $SCLKL_n$ (SCLK node); at least two serial data in pins $SDIH_n$, SDILn (SDI node); at least two serial data out pins $SDOH_n$, SDOLn (SDO node); at least two chip select pins $CSH_n$, $CSL_n$ (CS node), wherein pins associated with each of the SPI interface link nodes, i.e., SCLK node, SDI node, SDO node, CS node are in electrical signal communication with the SPI serial communication link 20. In operation, each of the SPI interface pins specified herein may or may not be in operable communication with the SPI communication link 20 depending on the number of battery monitor chips provided within the battery monitoring and control system 10 and the operating status of each battery monitoring chip.

As one skilled in the art will appreciate, such a pin configuration provides an operable SPI, allowing for bilateral communication between the plurality of battery monitor chips 24 up to n number of chips in communication with one or more battery cells 14 and the system controller 18.

In an embodiment of the invention, an additional conversion start pin CNVST, is used to start the data conversion. Even if the CNVST pin operates in a non-conforming or non-operational mode, conversions may still be initiated up the daisy chain of battery monitor chips 24 via redundant serial communication links, i.e., via the UART interface 46 and the UART serial communication link 22.

The battery monitor chips $24_{n-1}$ and $24_n$ illustrated in FIG. 3 each also include a plurality of pins adapted to form the UART interface 46. As noted above, the UART serial communication link 22 is intended to act as a redundant communication path between each of the battery monitor chips 24 and the system controller 18 in the event of a non-conforming event in the SPI or SPI communication link. Desirable serial communication between each system component may be achieved using UART interfaces and/or chip components in addition to the SPI.

In an embodiment of the invention shown in FIGS. 2-3 a battery monitoring and control system 10 includes a UART interface 46 that cooperates with at least one UART communication link 22 to perform various bi-directional communications between the system controller 18 and each battery monitor chip 24 and between each of the battery chips 24. When transmitting data, the UART interface 46 may transmit data at a slower rate (BAUD rate) than the SPI 44. However, when transmitting data using the UART interface 46, the vehicle 50 may operate in accordance with a limited operation strategy (LOS) state.

The system controller 18 and battery monitor chips 24 will coordinate in a way so that the redundant UART communication link 22 will be periodically tested in normal operation by performing a self-test. If the primary communication link 20 is not operation, and the UART communication link is operational, the vehicle may continue operating in a LOS state or mode. But, if neither the UART serial communication link 22 nor the primary communication link 20 is not operational, then the battery system may shut down.

Operations such as access to on chip registers, starting conversions, reading data off the chip, and the like that are performed via the primary serial interface (SPI) 46 may also be symmetrically performed by the redundant UART interface 44.

One skilled in the art of controllers and serial communications methods may appreciate the usage of a UART serial interface 46 upon each respective battery monitor chip 24, with transmit (TX) and receive (RX) pins cross-coupled between adjacent chips 24 for standard UART serial communication.

The redundant UART communication link 22, shown in FIGS. 2-3 as UART bus 22, is adapted to provide bi-directional communications between the plurality of battery monitor chips 24 and the system controller 18. The UART communication path may be implemented to communicate with each of the plurality of battery monitor chips 24 and the system controller 18 via a plurality of UART secondary interface nodes formed from transmit and receive pins TX, RX, respectively located upon each of the plurality of battery monitor chips 24 (shown in more detail in FIG. 3) and the system controller 18 (shown in FIG. 2).

In an embodiment of the invention, the UART communication link and interface 22, 46 may also receive time signals from a precision on-chip oscillator included in the system controller 18 and may be adapted to provide a UART clock signal to synchronize operations within the UART communication link.

The UART communication link 22 forms a serial connection between each of the plurality of battery monitor chips 24, and therefore, each respective battery monitor chip 24 includes a plurality of UART "in" pins and UART "out" pins, referred to herein as pin names ending with "L" and "H" suffixes, respectively.

In an embodiment of the invention, the UART interface 46 on each battery monitor chip 24 ensures the voltage levels are correctly handled for a chip 24 at a higher potential level that connects to a previous chip n−1 at a lower potential level. Thus, the chips $24_{n-1}$ and $24_n$ each having a different voltage potential may be serially connected. The additional UART communication link 22 to the chips $24_{n-1}$, $24_n$ allows for the correct banding of the voltage levels for each subsequent chip (n) at a higher potential level to the previous chip (n−1) at the lower potential level. Because the battery cells are in series, there is a voltage offset between the lower potential battery cell's battery monitor chip and the higher potential battery cell battery monitor chip that needs to be compensated for by a voltage correction to enable proper communications between each of the chips that are at different voltage potentials. The voltage correction factor may be made for the communications between the lower potential battery monitor chip and the higher potential battery monitor chip in a similar manner as known in the art for SPI communications, such as through use of the voltage regulator 34 associated with each battery monitoring module 42.

In an embodiment of the invention, when the battery monitor chip operates in a steady state, the current draw across each of the battery monitoring chips 24 is adjusted to be substantially equal within a predefined tolerance. Thus, the current and voltage measured across a first chip should be substantially similar to the current and voltage measured across a subsequent adjacent chip.

In an embodiment of the invention, all of the four primary SPI interface nodes $44_n$, $44_{n-1}$ and associated pins, namely $SDIH_n$, $SDIL_n$; $CSH_n$, $CSLn$; $SCLKH_n$, $SCLKL_n$; and $SDOH_n$, $SDOL_n$, $SDIH_{n-1}$, $SDIL_{n-1}$; $CSH_{n-1}$, $CSLn_{-1}$; $SCLKH_{n-1}$, $SCLKL_{n-1}$; and $SDOH_{n-1}$, $SDOL_{n-1}$, are located on the battery monitor chips $24_n$, $24_{n-1}$, respectively in such a way that none of the eight pins associated with the four SPI primary interface nodes $44_n$, $44_{n-1}$ are located adjacent to any of the Redundant Serial UART nodes $46_n$, $46_{n-1}$ or associated interface pins $TXH_n$, $RXL_n$; $RXH_n$, $TXL_n$ and $TXH_{n-1}$, $RXL_{n-1}$; $RXH_{n-1}$, $TSL_{n-1}$. Thus, if a single point connection such as a solder bridge or other non-conforming occurrence shorts two adjacent pins arbitrarily on the battery monitor chip $24_n$, $24_{n-1}$, then at least one of the two primary and secondary serial buses 20, 22 will remain operational. The pin configuration allowing for separation of the SPI nodes and the UART interface nodes is shown in FIG. 3, denoting at least one pin (not TX or RX) in between each set of SPI or UART interface nodes 44, 46 as a pin that is neither a TX nor a RX pin. However, the pin may be a CNVST pin.

Figure 4:
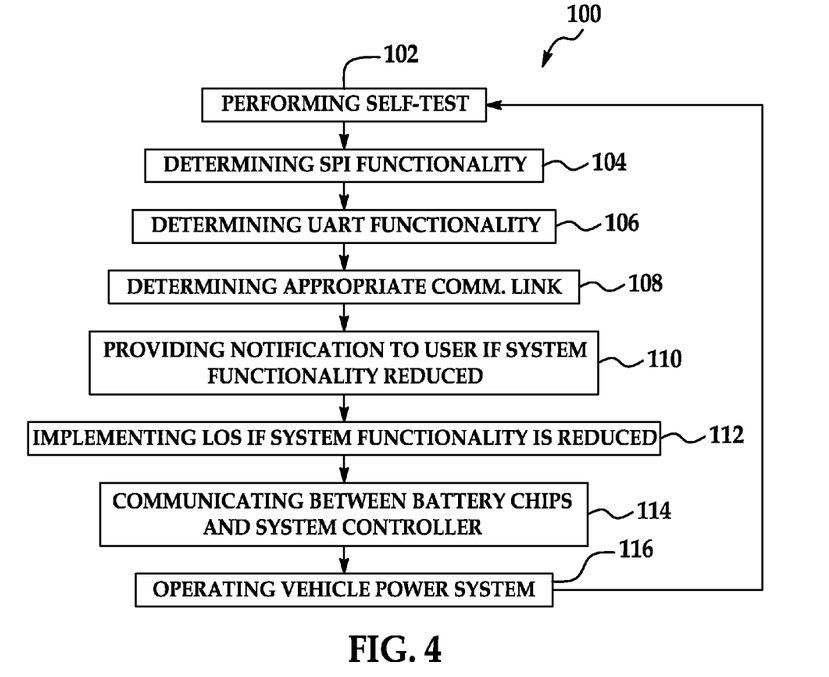
FIG. 4 is a flow chart illustrating a method of using a battery monitoring and control system.

A method of using the system 10, illustrated in FIG. 4, is provided and includes performing a self-test of the system to determine system functionality. Generally, the method determines functionality of a primary serial communication link; determines functionality of a redundant secondary serial communication link; selects a communication link from the primary or the secondary serial communication link to communicate between one or more battery monitor chips and the system controller; provides notification to a user if system functionality is reduced; and implements a limited operation strategy (LOS) if the system functionality is reduced.

More particularly, referring to the flowchart in FIG. 4, a method 100 of using the system 10 is illustrated and includes the system controller performing a self-test (102) of the system 10 to determine functionality of the components thereof; determining SPI functionality (104), wherein the system controller determines whether the SPI communication link is operating with reduced functionality; determining UART functionality (106), wherein the system controller determines whether the UART communication link is operating with reduced functionality; determining appropriate communication link (108), wherein the system controller determines whether to use the primary SPI communication link or the secondary UART communication link; providing notification to a user if system functionality is reduced (110), wherein the system controller operates to activate a user notification system that is adapted to provide a vehicle user with a notification that system functionality is reduced; implementing LOS if system functionality is reduced (112), wherein the system controller determines an appropriate LOS by which to operate the system if system functionality is reduced; communicating between battery monitor chips and system controller (114), wherein the system controller operates to initiate, transmit, receive, or terminate communication with at least one battery monitor chip of the plurality of battery monitor chips; and operating vehicle power systems (116), wherein the system controller operates to provide power from each respective battery to a vehicle central power system.

Figure 5:
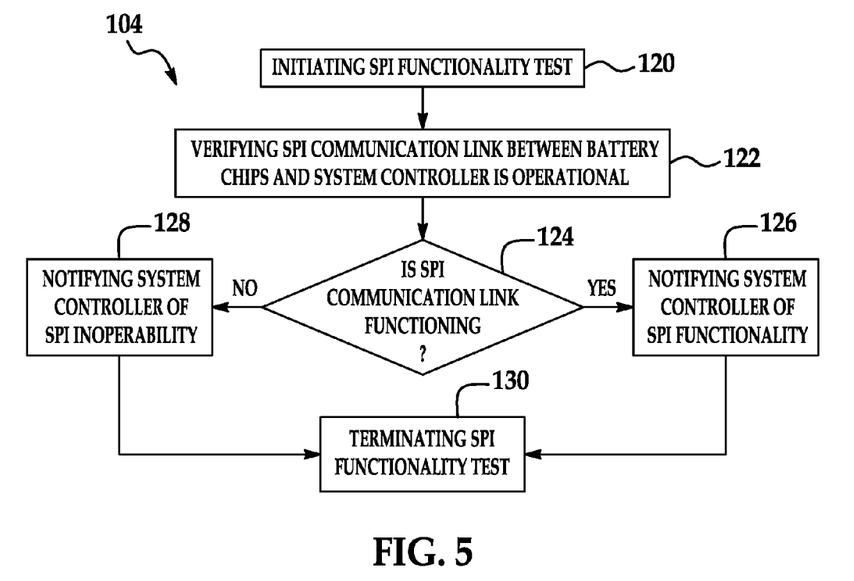
FIG. 5 is a flow chart illustrating a method of determining functionality of a Serial Peripheral Interface (SPI) in accordance with one embodiment of the invention.

In one embodiment of the invention, illustrated in FIG. 5, the method of determining SPI functionality (104) is shown in more detail and includes the system controller initiating an SPI functionality test (120); verifying that the SPI link between each respective battery monitor chip of the plurality of battery monitor chips, as well as the system controller, is operational (122); determining whether the SPI communication link is functioning (124) registering within the system controller to notify the system controller whether the SPI communication link is operational (126), (128); and terminating the SPI functionality test (130) when the SPI communication link is operable (126) or inoperable (128).

The self-test acquires data during an acquisition window defined by a predefined time period over which parameters including voltage are obtained through sampling of one or more battery cells are monitored. If the system includes more than one battery cell, then the sampled parameters are averaged, and a single average parameter value is reported for the multiple readings taken.

In an embodiment of the invention, the Acquisition window ranges between and includes 400 ns to 2 ms. Additionally, if an external event occurs, a system 10 check is performed within a predefined time. In an embodiment of the invention, the predefined time is within 100 uS of an external event occurrence.

Figure 6:
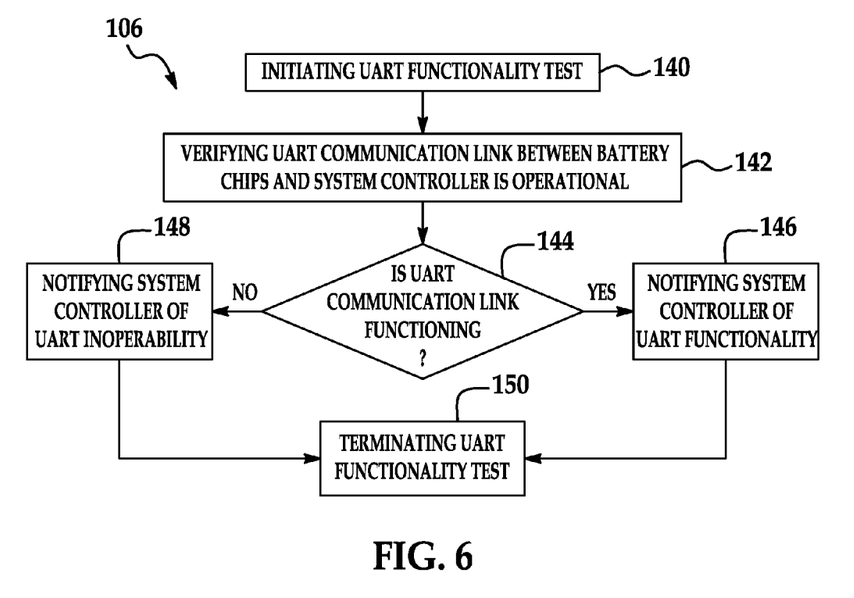
FIG. 6 is a flow chart illustrating a method of determining functionality of a Universal Asynchronous Receiver/Transmitter (UART) in accordance with one embodiment of the invention.

In one embodiment of the invention, illustrated in the flowchart shown in FIG. 6, the method of determining UART functionality (106) disclosed in more detail and includes the system controller initiating an UART functionality test (140); verifying that the UART link between each respective battery monitor chip of the plurality of battery monitor chips, as well as the system controller, is operational (142); determining whether UART communication link is functioning (144) registering within the system controller whether the UART communication link is operational (126), (128); and terminating the UART functionality test (150) when the UART communication link is operable (146) or inoperable (148).

Figure 7:
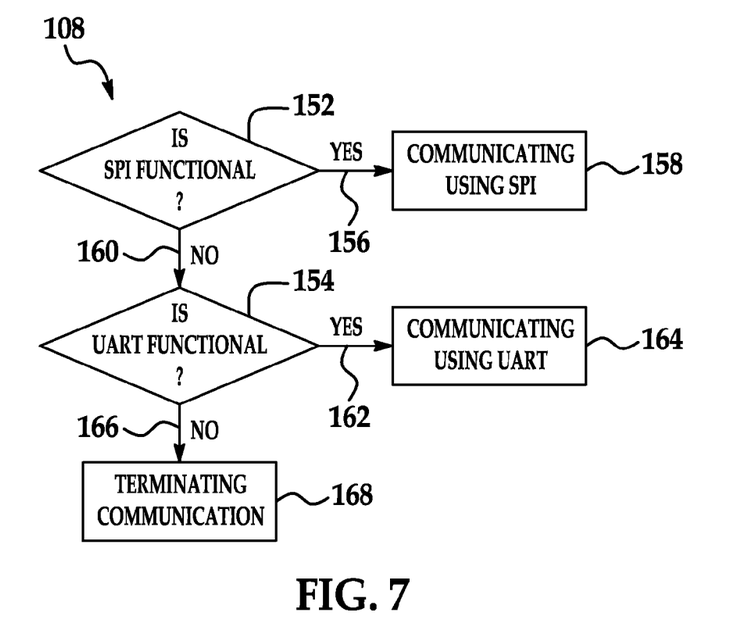
FIG. 7 is a flow chart illustrating a method of selecting a communication link in accordance with one embodiment of the invention.

In one embodiment of the invention, illustrated in the flowchart shown in FIG. 7, the method of determining appropriate communication link (108) is disclosed in further detail and includes the system controller determining whether each of the SPI and UART communication links are functional (152), (154). If the system controller determines that the SPI communication link is functional (156), the system controller initiates communicating using the SPI (158). If the system controller determines that the SPI is operating with reduced functionality (160), the system controller then operates to determine the functionality of the UART communication link (154). If the system controller determines that the SPI is operating with reduced functionality, but the UART is operating with full functionality (162), the system controller initiates communicating using the UART communication link (164). If the system controller determines that each of the SPI and UART are operating with reduced functionality (166), the system controller then terminates communication (168).

Figure 8:
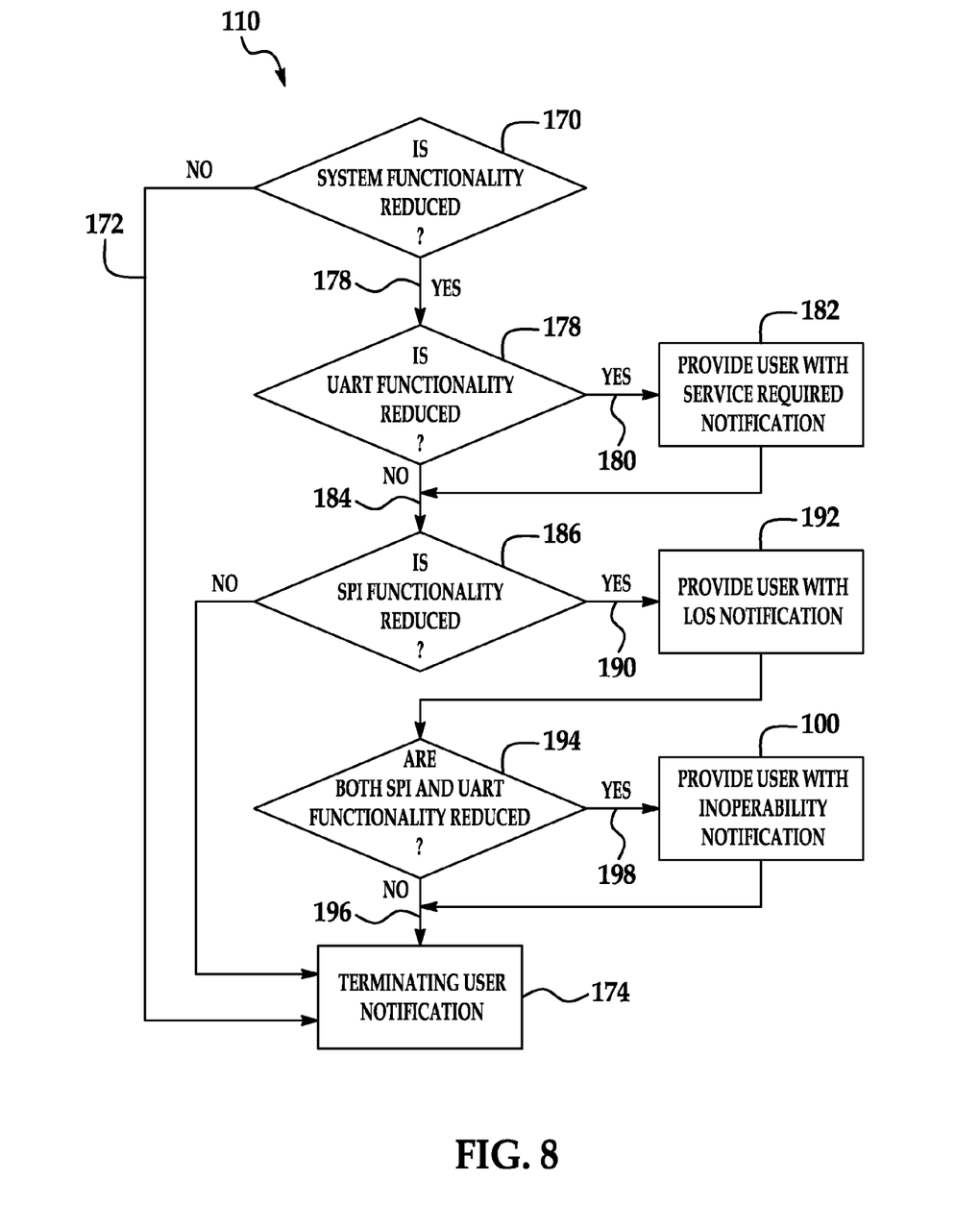
FIG. 8 is a flow chart illustrating a method of providing notification to a user if system functionality is reduced in accordance with one embodiment of the invention.

In one embodiment of the invention, illustrated in the flowchart shown in FIG. 8, the method of providing notification to a user if system functionality is reduced (110) is disclosed in further detail and includes the system controller determining if system functionality is reduced (170); if system functionality is not reduced (172), the system controller operates to terminate user notification (174). If the system controller determines that system functionality is reduced (176), the system controller then determines whether UART functionality is reduced (178). If the system controller determines that UART functionality is reduced (180), the system controller then operates to provide a user notification module with a signal prompting the user notification module to provide a user with a "service required" notification (182). If the system controller determines that UART functionality is not reduced (184), the system controller then operates to determine whether SPI functionality is reduced (186). If the system controller determines that SPI functionality is not reduced (188), the system controller then operates to terminate user notification (174). If the system controller determines that SPI functionality is reduced (190), the system controller then operates to prompt the user notification module to provide a user with a "LOS" notification.

The system controller may then operate to determine whether both the SPI and UART communication links are operating with reduced functionality (194). If the system controller determines that only one of the SPI and UART are operating with reduced functionality (196), the system controller then operates to terminate user notification (174). If the system controller determines that both the SPI and UART are operating with reduced functionality (198), the system controller operates to prompt the user notification module to provide an "inoperability" notice to a user (100), and then operates to terminate user notification (174).

Figure 9:
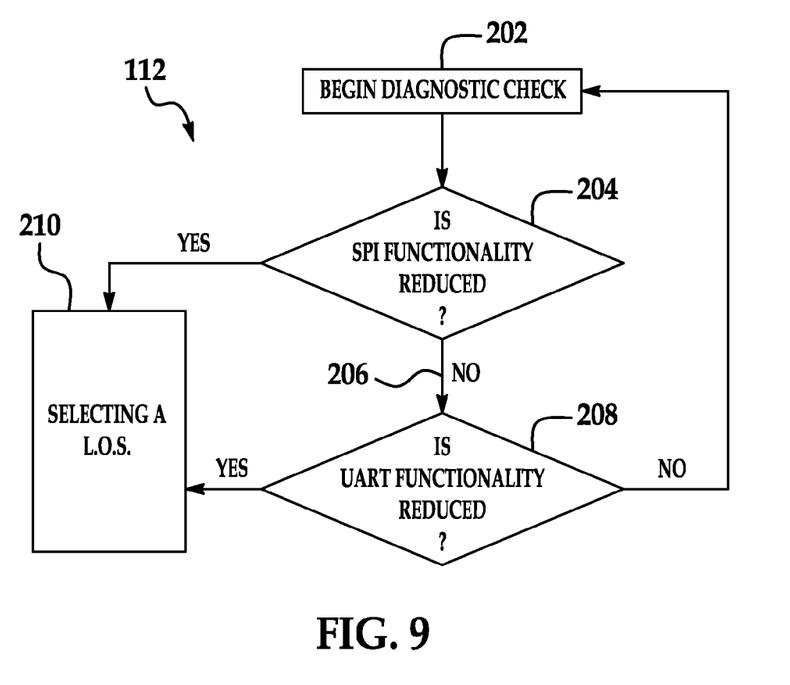
FIG. 9 is a flow chart illustrating a method of implementing a Limited Operational Strategy (LOS) in accordance with one embodiment of the invention.

In one embodiment of the invention, illustrated in the flowchart shown in FIG. 9, the method of implementing a LOS if system functionality is reduced (112) is disclosed in further detail and includes initiating a diagnostic check 202, the system controller determining if SPI functionality is reduced (204) and selecting a LOS if SPI or UART functionality is reduced (210); determining if the UART functionality is reduced (208) if the SPI functionality is not reduced (206); selecting a LOS based upon system conditions (210) if either the SPI functionality is reduced or the UART functionality is reduced; and restarting the diagnostic check (202) if neither the SPI nor the UART functionality is reduced.

In another embodiment of the invention, the system controller may select from a plurality of LOS's an appropriate LOS under which to operate the system based upon system conditions. At a vehicle level, when operating in a LOS, some of the performance parameters may need to be reduced, such as power limits published for the battery to provide allowable margins for power that needs to be reduced depending on knowledge about the battery SOC and sampling frequency used to determine the underlying measurement of cell voltages.

It is to be understood that the specific methods and techniques which have been described are merely illustrative of one application of the principles of the invention. Numerous modifications may be made to the method and system as described without departing from the true spirit and scope of the invention.

What is claimed is:

1. A battery monitoring and control system comprising:
    at least one battery cell operatively connected with at least one electronic device;
    at least one battery monitor module, associated with each of the at least one battery cells, and having a primary communication interface and a redundant secondary communication interface;
    a system controller in operative and in signal communication with each battery monitor module configured to monitor and gather data from the at least one battery chip, and to execute instructions to control charge balancing of the at least one battery cell;
    primary and secondary communication links configured to independently electrically couple the at least one battery monitoring module to the system controller.

2. The battery monitoring system of claim 1, wherein the battery cell comprises:
    a battery pack formed from one or more lithium ion cells, fuel cells, or electrochemical cell.

3. The battery monitoring and control system of claim 1, further comprising:
    at least one battery monitor chip associated with the at least one battery monitor module.

4. The battery monitoring and control system of claim 1, comprising:
    a plurality of battery monitor modules each associated with a respective one of a plurality of battery cells, wherein each of the plurality of battery monitor modules are electrically coupled in series in a daisy chain configuration with each other and with the system controller.

5. The battery monitoring and control system of claim 4, wherein each of the plurality of battery monitor modules bands voltage potentials between each of the plurality of battery monitor modules to regulate voltage across each of the plurality of battery monitor modules.

6. The battery monitoring and control system of claim 1, the electronic device comprises:
    at least one electronic component within an electric, hybrid, hybrid electric or fuel cell vehicle.

7. The battery monitoring and control system of claim 1, further comprising:
    a serial peripheral interface (SPI) serial communication link defining the primary communication link; and
    a SPI defining the primary communication interface associated with the at least one battery monitor module.

8. The battery monitoring and control system of claim 7, further comprising:
    at least four primary interface nodes associated with the SPI, wherein the primary interface nodes include a serial data out (SDO) node, a serial data in (SDI) node, a serial clock (SCLK) node, and a chip select (CS) node.

9. The battery monitoring and control system of claim 8, further comprising:
    an UART serial communication link defining the secondary communication link; and
    an UART interface defining the secondary communication interface associated with at least one battery monitor chip associated with the at least one battery monitor module.

10. The battery monitoring and control system of claim 9, further comprising:
    at least two secondary interface nodes associated with the UART interface, wherein the secondary interface nodes includes
        at least one transmit (TX) node and at least one receive (RX) node, wherein the four primary interface nodes are not adjacent to either of two secondary interface nodes.

11. The battery monitoring and control system of claim 10, wherein the at least one transmit node interface comprises:
    a transmit high pin ($TXH_{n-1}$) adapted to couple with a receive node ($RXL_n$) associated with a next higher potential battery monitor chip in the serial daisy chain; and
    a transmit low pin ($TXL_n$) associated with the next higher potential battery monitor chip adapted to couple with a receive node ($RXH_{n-1}$) associated with a previous lower potential battery monitor chip.

12. The battery monitoring and control system of claim 10, wherein the at least one receive node comprises:
- a receive high pin ($RXH_{n-1}$) adapted to couple with the transmit node interface ($TXL_n$) associated with a next higher potential battery monitor chip; and
- a receive low pin ($RXL_n$) associated with the next higher potential battery monitor chip adapted to couple with a transmit node interface ($TXH_{n-1}$) associated with a previous lower potential battery monitor chip.

13. The battery monitoring and control system of claim 10, wherein the UART interface, and the UART serial communication link are configured to provide redundant and symmetrical communications between each of the battery monitor modules and the system controller.

14. The battery monitoring system of claim 1, further comprising:
- a plurality of serial peripheral interface (SPI) primary interface nodes associated with the SPI, wherein the primary interface nodes include a serial data out (SDO) node, a serial data in (SDI) node, a serial clock (SCLK) node, and a chip select (CS) node;
- at least one SDO, SDI, SCLK, CS node; and
- a plurality of UART secondary interface nodes including at least one transmit interface node and at least one receive interface node.

15. The battery monitoring and control system of claim 14, wherein the four SPI primary interface nodes are not adjacent to the two UART secondary interface nodes.

16. The battery monitoring and control system of claim 1, wherein the secondary communication interface is configured to perform symmetrical and redundant operations performed by the primary communication interface including operations that access on chip registers, start conversions, and read data associated with the battery monitor chip.

17. A battery monitoring method for monitoring and controlling a battery monitoring system including an electronic device and battery cells that operate to power the electronic device in operative electrical communication with a system controller and a plurality of associated battery monitoring modules comprising:
- performing a self-test of the system to determine system functionality;
- determining functionality of a primary serial communication link;
- determining functionality of a redundant secondary serial communication link;
- selecting a communication link from the primary or the secondary serial communication link to communicate between one or more battery monitor modules and a system controller;
- providing notification to a user if system functionality is reduced; and
- implementing a limited operation strategy (LOS) if the system functionality is reduced.

18. The battery monitoring and control method of claim 17 further comprising:
- using the system controller to determine whether the primary serial communication link is operating with reduced functionality, whether the secondary serial communication link is operating with reduced functionality, whether to use the primary serial communication link or the secondary serial communication link, and to activate a user notification system that is adapted to provide a vehicle user with a notification that system functionality is reduced when the system functionality is reduced.

19. The battery monitoring and control method of claim 17, further comprising:
- using the system controller to select an appropriate LOS by which to operate the system if system functionality is reduced.

20. The battery monitoring and control method of claim 17, further comprising:
- communicating between each of the plurality battery monitor modules and system controller, wherein the system controller operates to initiate, transmit, receive, or terminate communication with one or more battery monitor modules; and
- operating vehicle power systems, wherein the system controller operates to provide power from each respective battery cell to the electronic device.

* * * * *